United States Patent
Ranghabhatla et al.

(10) Patent No.: US 11,222,012 B2
(45) Date of Patent: Jan. 11, 2022

(54) METHOD, APPARATUS, AND COMPUTER-READABLE MEDIUM FOR DYNAMIC HIERARCHICAL DATA FLOW MAPPING

(71) Applicant: Informatica LLC, Redwood City, CA (US)

(72) Inventors: Chandra Vikas Ranghabhatla, Mountain View, CA (US); Tejaswinee Sohoni, Sunnyvale, CA (US)

(73) Assignee: INFORMATICA LLC, Redwood City, CA (US)

( * ) Notice: Subject to any disclaimer, the term of this patent is extended or adjusted under 35 U.S.C. 154(b) by 10 days.

(21) Appl. No.: 16/915,062

(22) Filed: Jun. 29, 2020

(65) Prior Publication Data
US 2020/0409946 A1 Dec. 31, 2020

Related U.S. Application Data

(60) Provisional application No. 62/868,503, filed on Jun. 28, 2019.

(51) Int. Cl.
*G06F 16/00* (2019.01)
*G06F 16/242* (2019.01)
(Continued)

(52) U.S. Cl.
CPC ........ *G06F 16/2423* (2019.01); *G06F 16/221* (2019.01); *G06F 16/24564* (2019.01); *G06F 16/254* (2019.01); *G06F 16/282* (2019.01)

(58) Field of Classification Search
CPC ............. G06F 16/211; G06F 16/24564; G06F 16/254; G06F 16/221; G06F 16/2423; G06F 16/282
See application file for complete search history.

(56) References Cited

U.S. PATENT DOCUMENTS

| | | | | |
|---|---|---|---|---|
| 2008/0263515 | A1* | 10/2008 | Dellas | G06Q 10/06 717/109 |
| 2013/0332897 | A1* | 12/2013 | Dim | G06F 8/35 717/104 |
| 2017/0329786 | A1* | 11/2017 | Chow | G06F 16/9535 |

OTHER PUBLICATIONS

Pino et al., "Hierarchical Static Scheduling of DataFlow Graphs onto Multiple Processors", IEEE, 1995, pp. 2643-2646. (Year: 1995).*

(Continued)

*Primary Examiner* — Cheryl Lewis
(74) *Attorney, Agent, or Firm* — Amardeep S. Grewal; Reed Smith LLP

(57) ABSTRACT

A method, apparatus, and computer-readable medium for dynamic hierarchical data flow mapping, including storing dynamic data flow mappings, each dynamic data flow mapping including a mapping of data from an input port corresponding to a source data container to an output port corresponding to a destination data container and a dynamic hierarchical field having a dynamic hierarchical data type, determining a rule language corresponding to each dynamic hierarchical field in the dynamic data flow mappings, the rule language defining acceptable parameters for sub-fields of that dynamic hierarchical data type, and generating static data flow mappings by resolving all dynamic hierarchical fields into static hierarchical fields during compilation of the dynamic data flow mappings with the source data container and the destination data container, the static data flow mappings being generated based at least in part on the rule language corresponding to each dynamic hierarchical field and underlying data in one or more of the source data container or the destination data container.

21 Claims, 12 Drawing Sheets

(51) Int. Cl.
  *G06F 16/25*     (2019.01)
  *G06F 16/22*     (2019.01)
  *G06F 16/2455*   (2019.01)
  *G06F 16/28*     (2019.01)

(56) References Cited

OTHER PUBLICATIONS

Lee et al., Dataflow Process Networks, IEEE, 1995, pp. 773-799. (Year: 1995).*

* cited by examiner

METHOD, APPARATUS, AND COMPUTER-READABLE MEDIUM FOR DYNAMIC HIERARCHICAL DATA FLOW MAPPING

RELATED APPLICATION DATA

This application claims priority to U.S. Provisional Application No. 62/868,503, filed Jun. 28, 2019, the disclosure of which is hereby incorporated by reference in its entirety.

BACKGROUND

Enterprises dealing with large amounts of data move data from one data warehouse to another as well as perform data processing operations to cleanse, transform and aggregate data. These operations are achieved by designing data flow mappings. U.S. Nonprovisional patent application Ser. No. 15/152,502, filed May 11, 2016, the entire disclosure of which is hereby incorporated by reference in its entirety, describes a system for data flow design with static and dynamic elements. Data flow mappings typically map from one or more containers in a source database or document, having a source schema, to one or more containers in a target database or document, having a target data schema. As used herein, containers refer to any structure configured to store data of particular type, such as columns or fields.

Large data intensive enterprises would also store and use data that is hierarchical in nature—data that is structured in a tree like fashion. Hierarchical data is usually structured as a combination of different kinds of hierarchies—collections, multi-occurring hierarchies (arrays) etc. These structures (metadata) are typically described in documents called schemas.

Performing the previously mentioned data operations around hierarchical data would require definition of schemas to go along with each hierarchical column (data field) in a data flow mapping.

When designing data flow mappings to process data from multiple data sources that have similar data with structural differences within the hierarchical columns, one would need to define a data flow mapping for each data source as well as redundantly define schemas to support hierarchical columns in each of the data flow mappings.

For example, a multinational company looking to process hierarchical customer data belonging to different countries/regions would need to define separate data flow mappings whenever there is a minor regional difference in, say, the Address structure. Factoring in the maintenance costs that come with having multiple data flow mappings, this results in a large operational overhead. The use of multiple variations of similar data flow mappings is also an inefficient use of available computing resources, such as storage, memory, and processing power.

DETAILED DESCRIPTION

Figure 1A:
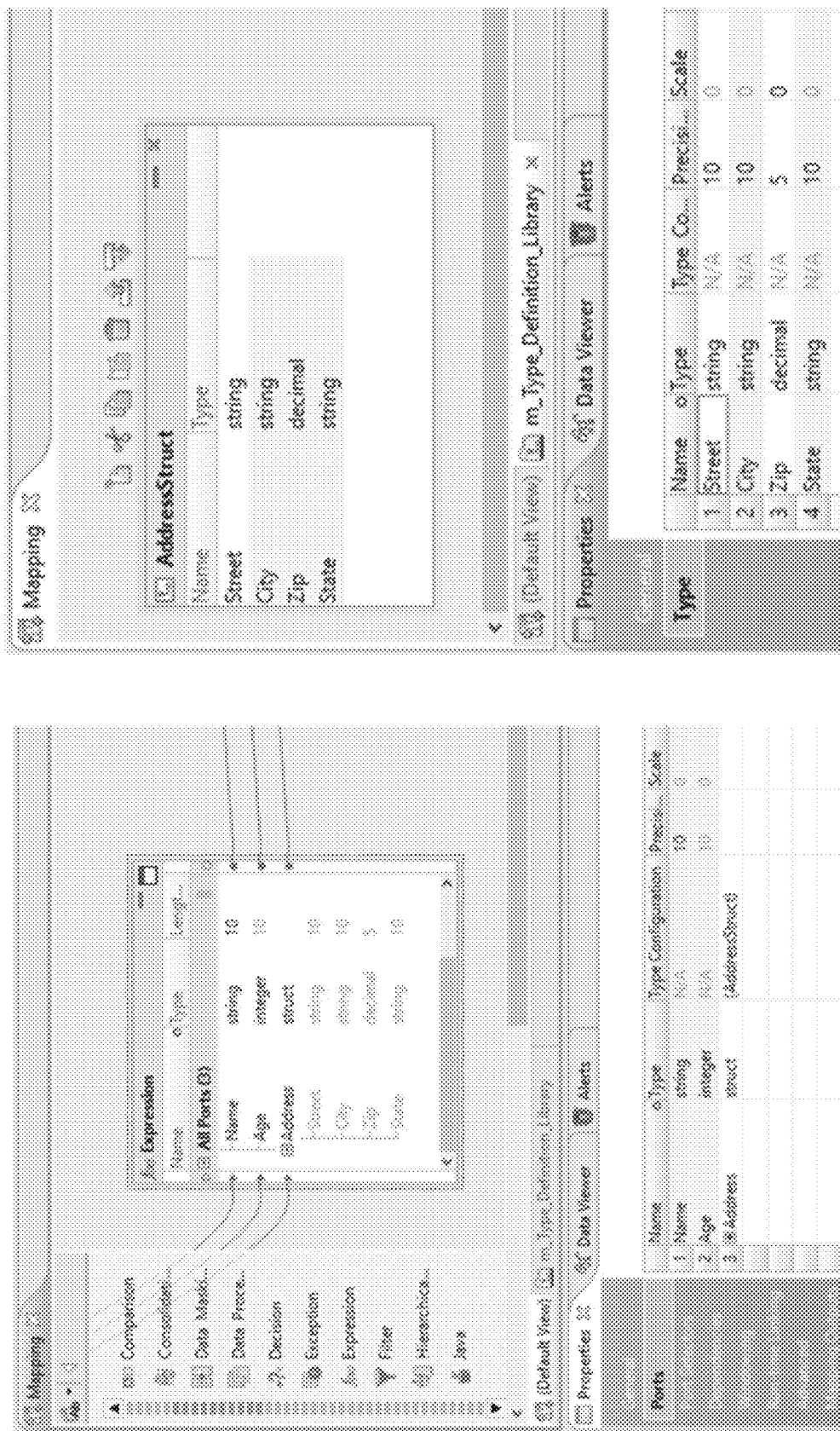
FIGS. 1A-1C illustrate data flow mapping fragments to process data in data tables containing different versions of a hierarchical Address column.

While methods, apparatuses, and computer-readable media are described herein by way of examples and embodiments, those skilled in the art recognize that methods, apparatuses, and computer-readable media for dynamic hierarchical data flow mapping are not limited to the embodiments or drawings described. It should be understood that the drawings and description are not intended to be limited to the particular forms disclosed. Rather, the intention is to cover all modifications, equivalents and alternatives falling within the spirit and scope of this disclosure. Any headings used herein are for organizational purposes only and are not meant to limit the scope of the description or the claims. As used herein, the word "can" is used in a permissive sense (i.e., meaning having the potential to) rather than the mandatory sense (i.e., meaning must). Similarly, the words "include," "including," "includes", "comprise," "comprises," and "comprising" mean including, but not limited to.

Applicant has discovered a novel method, apparatus, and computer-readable medium that solves the above-mentioned problems associated with processing hierarchical data. The hierarchical data described in this disclosure can be, for example, some combination of data structures or elements, collections of elements, arrays of elements, and/or maps that map particular keys to elements.

The novel solution disclosed herein allows for the definition of data flow mappings within which hierarchical data can be described without having to define concrete schemas and leverages schema-less descriptions (rule-based description) of hierarchical data to define reusable data flow mappings that can be used across data sources and/or targets that have sub-structural differences. Schema-less descriptions are then, at a later stage, paired with schemas (internally generated and/or inferred) when different data sources are applied to the data flow mappings.

The disclosed systems and method provide several advantages. Using the disclosed system, data flow systems can be implemented that process hierarchical data that is read from multiple hierarchical data sources (repositories) and write it to one or more hierarchical data sources while at the same time leveraging transformation logic on the data within the hierarchical columns. A data flow designer can use this system to design a single data flow mapping that can be reused for different source metadata based upon the structural differences between the different source metadata.

Additionally, the present system allows for auxiliary dynamic R2H (Relational-to-Hierarchical) building patterns to be able to read from multiple flat data sources with varying column schemas and transform the shape of the data to a hierarchical structure to be further written to a hierarchical data source. This construction of hierarchical data columns can be encoded in a single data flow mapping and be reused for different versions of flat data.

The present system also allows for auxiliary dynamic Hierarchical-to-Relational (H2R) flattening patterns to be able to read from multiple complex sources with varying hierarchical schema and flatten the data to completely two-dimensional relational data. This flattening of hierarchical data columns can be described once in a single data flow mapping and can be used for different versions of complex data The disclosed system also allows data flow designers to describe hierarchical schema using rule language without requiring that the designer have expert knowledge of schema definition languages.

The benefits and operation of the disclosed system will now be explained with reference to the examples of data flow mapping shown in FIGS. 1A-1C, which illustrate fragments of three different data flow mappings configured to process hierarchical data.

FIG. 1A illustrates a data flow mapping fragment 101A to process data in a data table that contains a hierarchical Address column with the sub-fields of Street, City, Zip, State. As shown in the user defined type library interface 102A, it is necessary for the user to define a specific hierarchical address structure that corresponds to the sub-fields of the hierarchical address column in the underlying data table.

Figure 1B:
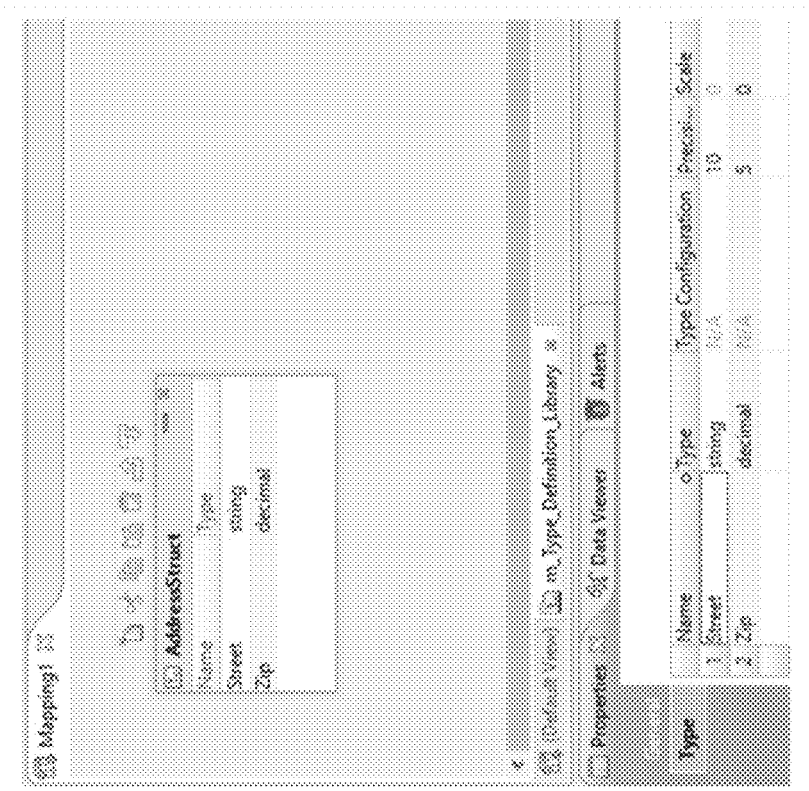
Figure 1B:
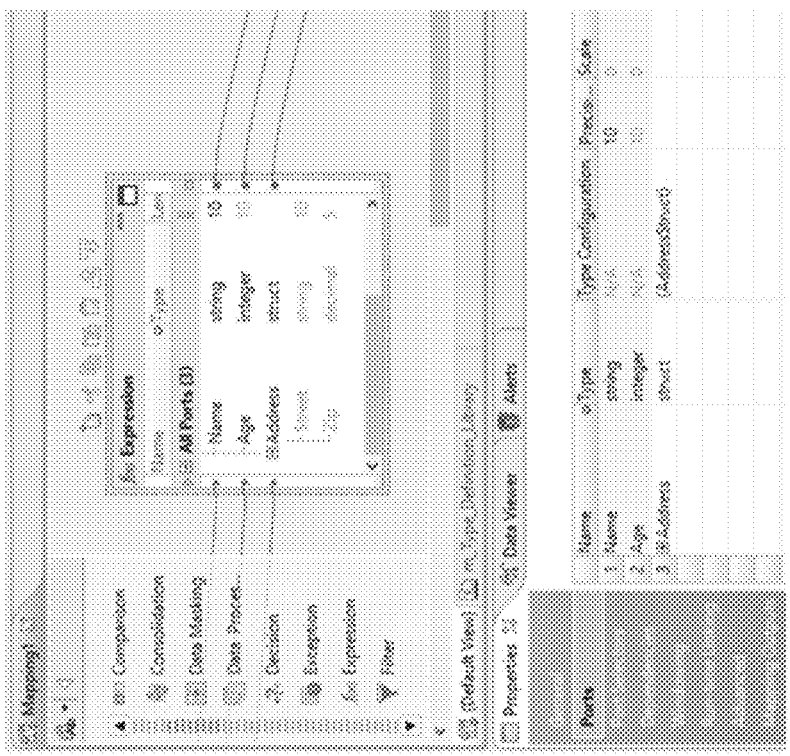

FIG. 1B illustrates a data flow mapping fragment 101B to process data that contains a similar hierarchical Address column but with fewer sub-fields—just Street and Zip. Once again, as shown in the a user defined type library interface 102B, it is necessary for the user to create a separate hierarchical address structure with just these two fields in order to perform the data flow mapping specified in 101B.

Figure 1C:
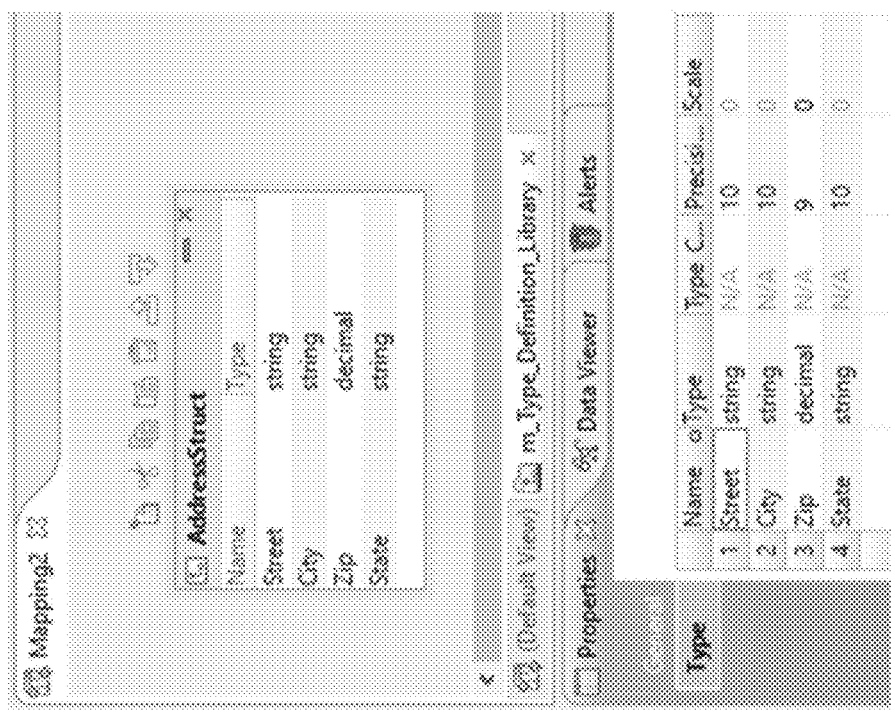
Figure 1C:
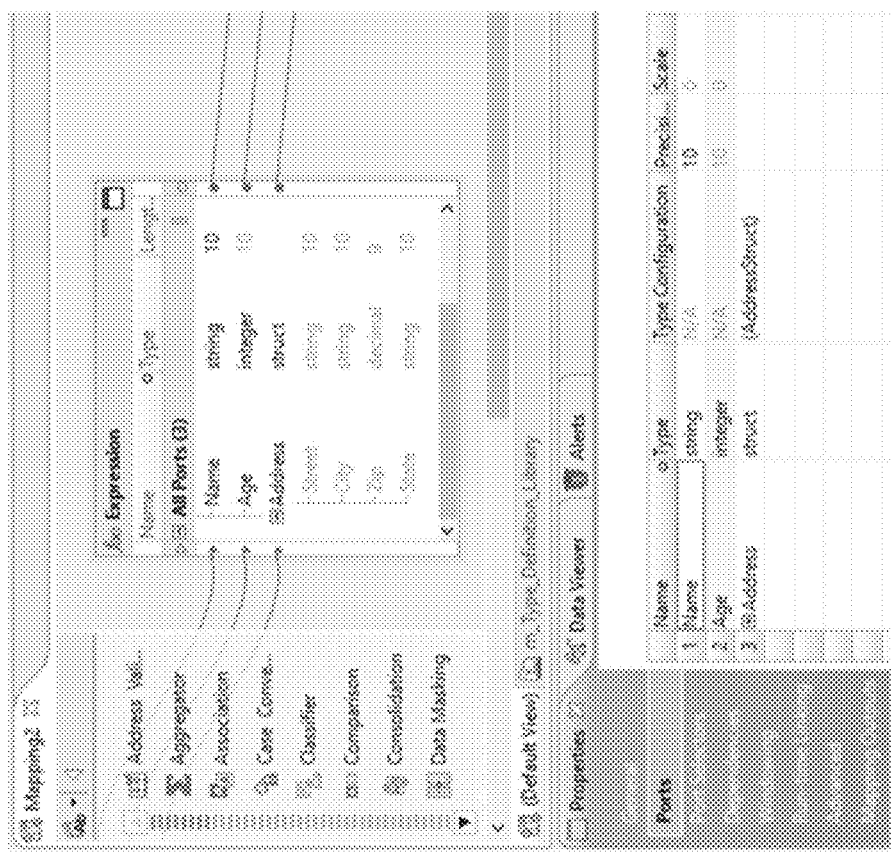

FIG. 1C illustrates a data flow mapping fragment 101C to process data that contains a third version of a hierarchical Address column with the sub-fields Street, City, Zip, State. In this version of the hierarchical Address column, the Zip sub-field is stored as decimal with 9 digits of precision (to allow for a zip code+4 digits), whereas in the version shown in FIG. 1A, the Zip sub-field has only 5 digits of precision. Despite the similarity in sub-fields to the hierarchical Address column shown in FIG. 1A, a user would still be required to define a new type for this particular Address structure, as shown in interface 102C.

As shown in FIGS. 1A-1C, a non-dynamic design of a data flow process, as it exists before this invention, requires definition of distinct jobs for changes in hierarchical elements across data sources as well as definition of distinct user types for each of the jobs. For example, the data flow mapping in FIG. 1B differs from the one on FIG. 1A by having lesser elements in the Address structures. Additionally, the data flow mapping in FIG. 1C differs from the one in FIG. 1A by allowing for a longer ZIP code in the Address structure. Such differences across data sources would ordinarily require the creation and maintenance of distinct data flow mappings.

Unlike previous systems, in the present system, a dynamic design of the data flow processes shown in FIGS. 1A-1C requires definition of only one data flow mapping and does not require any accompanying user types. Instead, the structure of each type of hierarchical data is generated based on information extracted from the underlying data set itself during compilation of the data flow mapping with a particular data source. The structure of each type is therefore inferred upon initialization and execution of the data flow mapping.

Figure 2:
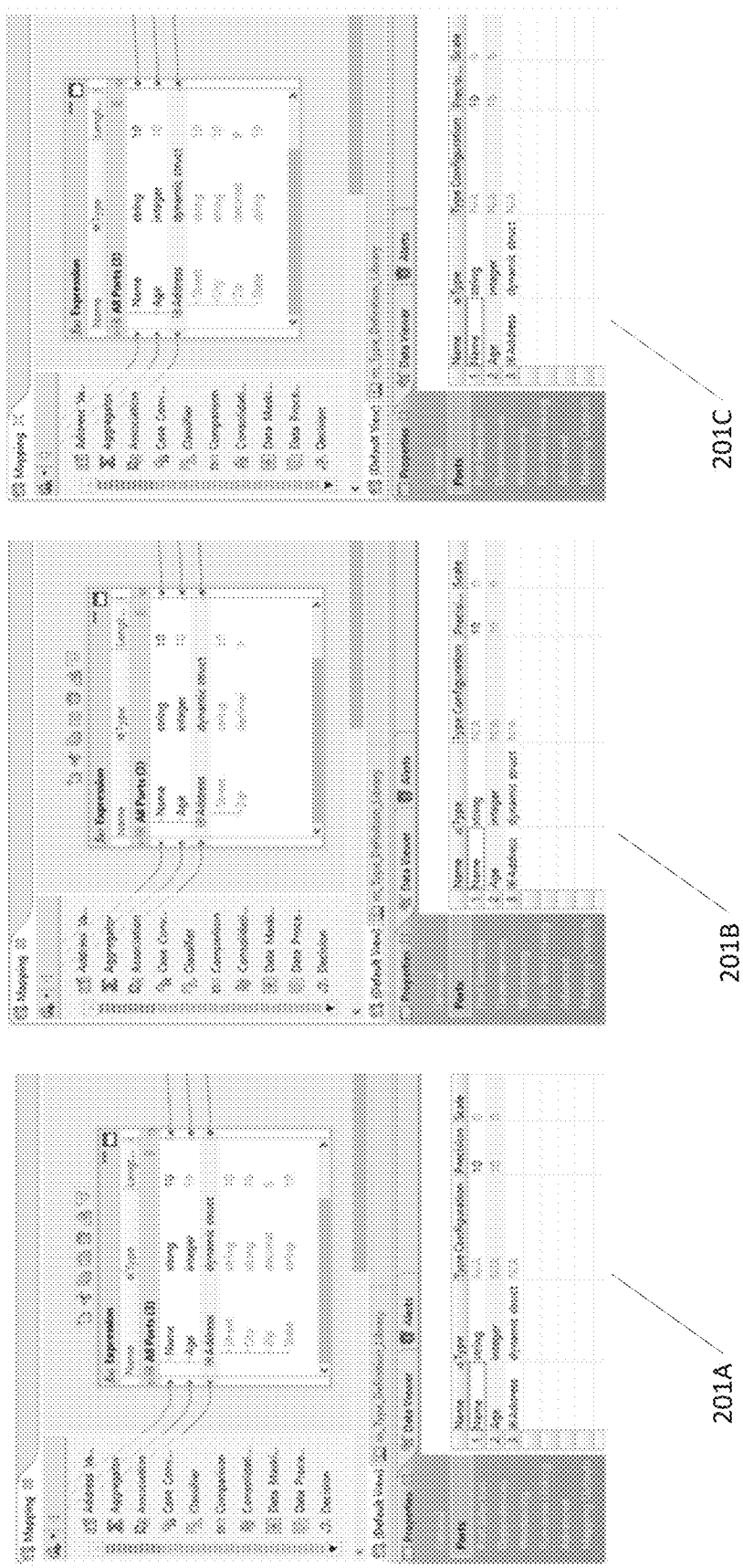
FIG. 2 illustrates an extract, transform, load (ETL) job processed using dynamic hierarchical data types for dynamic data flow design according to an exemplary embodiment.

FIG. 2 illustrates the same extract, transform, load (ETL) job shown in FIGS. 1A-1C when processed using dynamic hierarchical data types for dynamic data flow design according to an exemplary embodiment. As shown in interfaces 201A, 201B, and 201C of FIG. 2, a single data flow mapping can be utilized for all of the different data sources (having different address structures) previously described with respect to FIGS. 1A-1C. This is accomplished using a dynamic data flow mapping, which is a mapping of data from an input port corresponding to a source data container to an output port corresponding to a destination data container that uses a dynamic hierarchical field having a dynamic hierarchical data type. The dynamic hierarchical field is configured to adapt to the underlying structure of a particular source data container or target data container during compilation of the dynamic data flow mapping. This dynamic structure means that users are not required to define user data types with specific sub-fields and parameters to support hierarchical columns. Instead, rules are defined on the dynamic hierarchical data fields that are configured to adapt the dynamic columns to the structure of data from a particular data source in order to satisfy target schema restrictions for a destination schema of the mapping.

Figure 3:
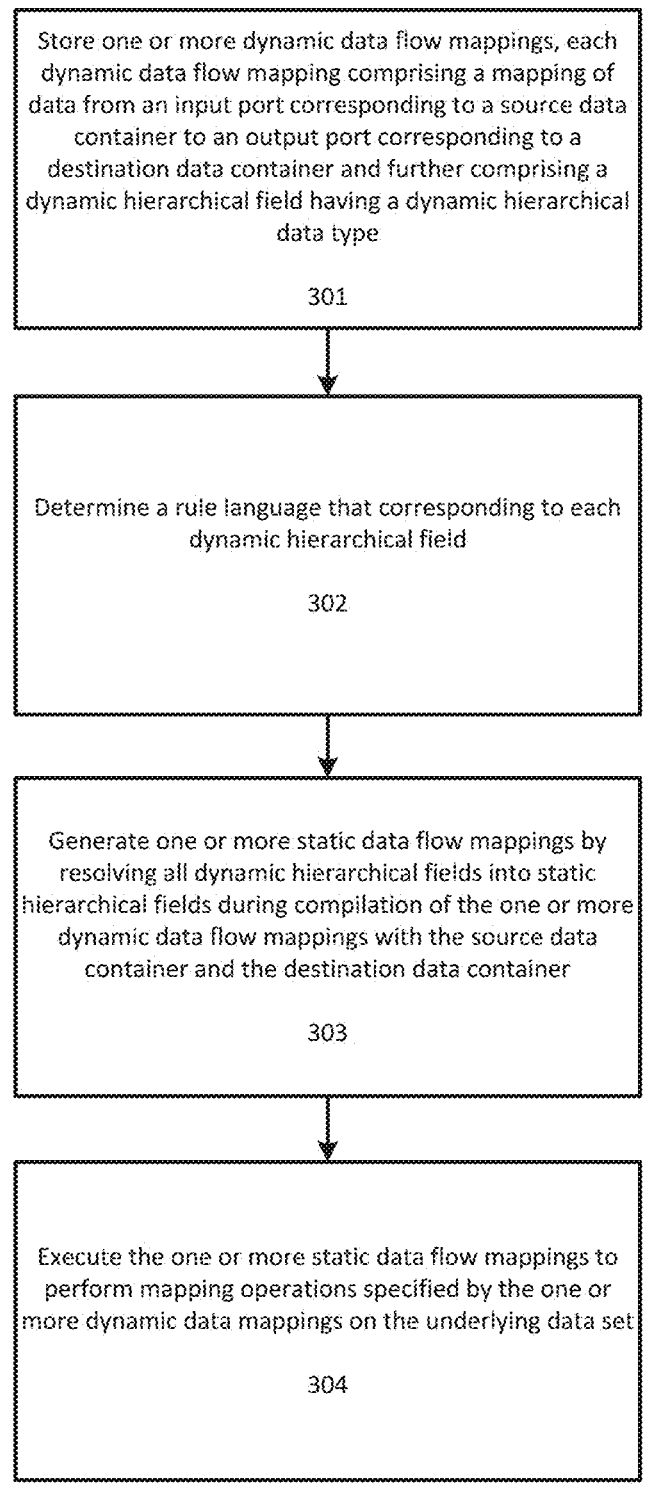
FIG. 3 illustrates a method for dynamic hierarchical data flow mapping according to an exemplary embodiment.

FIG. 3 illustrates a method for dynamic hierarchical data flow mapping according to an exemplary embodiment.

At step 301 one or more dynamic data flow mappings are stored, each dynamic data flow mapping comprising a mapping of data from an input port corresponding to a source data container to an output port corresponding to a destination data container and including a dynamic hierarchical field having a dynamic hierarchical data type. Each dynamic data flow mapping links an input container in a source schema to an output container in a target schema As previously explained, a container can be any structure configured to store data of particular type, such as columns, fields, or tables.

The dynamic hierarchical data type can be, for example, a dynamic structure ("struct"), a dynamic array, a dynamic map, a dynamic class object, or other type of dynamic hierarchical data type. In the case of a dynamic map, which stores pairs of sub-fields (the key-value pairs), each pair of sub-fields can be dynamically determined at compile time, similar to other dynamic hierarchical data types.

Each of the stored dynamic data flow mappings can be generated by initializing one or more dynamic hierarchical fields having a dynamic hierarchical data type and then defining a dynamic data flow mapping using the initialized dynamic hierarchical fields, The initialization can occur in response to receiving a set of inputs from a user in a graphical user interface, such as graphical data flow mapping tool. For example, a user can instantiate a new dynamic hierarchical field having a dynamic hierarchical data type, such as the address field shown in FIG. 2, which is a dynamic structure type. As described above, dynamic hierarchical data types (and associated dynamic hierarchical fields) have a dynamic (i.e., variable and non-static) number and type of subfields, that will depend upon the underlying data source(s) used with the dynamic data flow mapping.

The step of defining dynamic data flow mappings using the one or more dynamic hierarchical fields can include receiving an input from a user specifying the dynamic hierarchical field and one or more of the input port or the output port and initializing a dynamic data flow mapping having the dynamic hierarchical data type.

The step of defining dynamic data flow mappings can also be performed by detecting a dynamic hierarchical field within a data flow mapping. For example, the system can receive a data flow mapping comprising a mapping of data from an input port corresponding to the source data container to an output port corresponding to destination data container and then determine that the data flow mapping is a dynamic data flow mapping based at least in part on detection of the dynamic hierarchical field in the data flow mapping.

As dynamic data flow mappings are processed differently that non-dynamic data flow mappings during compilation of the data flow mappings with the underlying source and target containers, a flag or other variable can be used to track which data flow mappings are dynamic data flow mappings.

Figure 4:
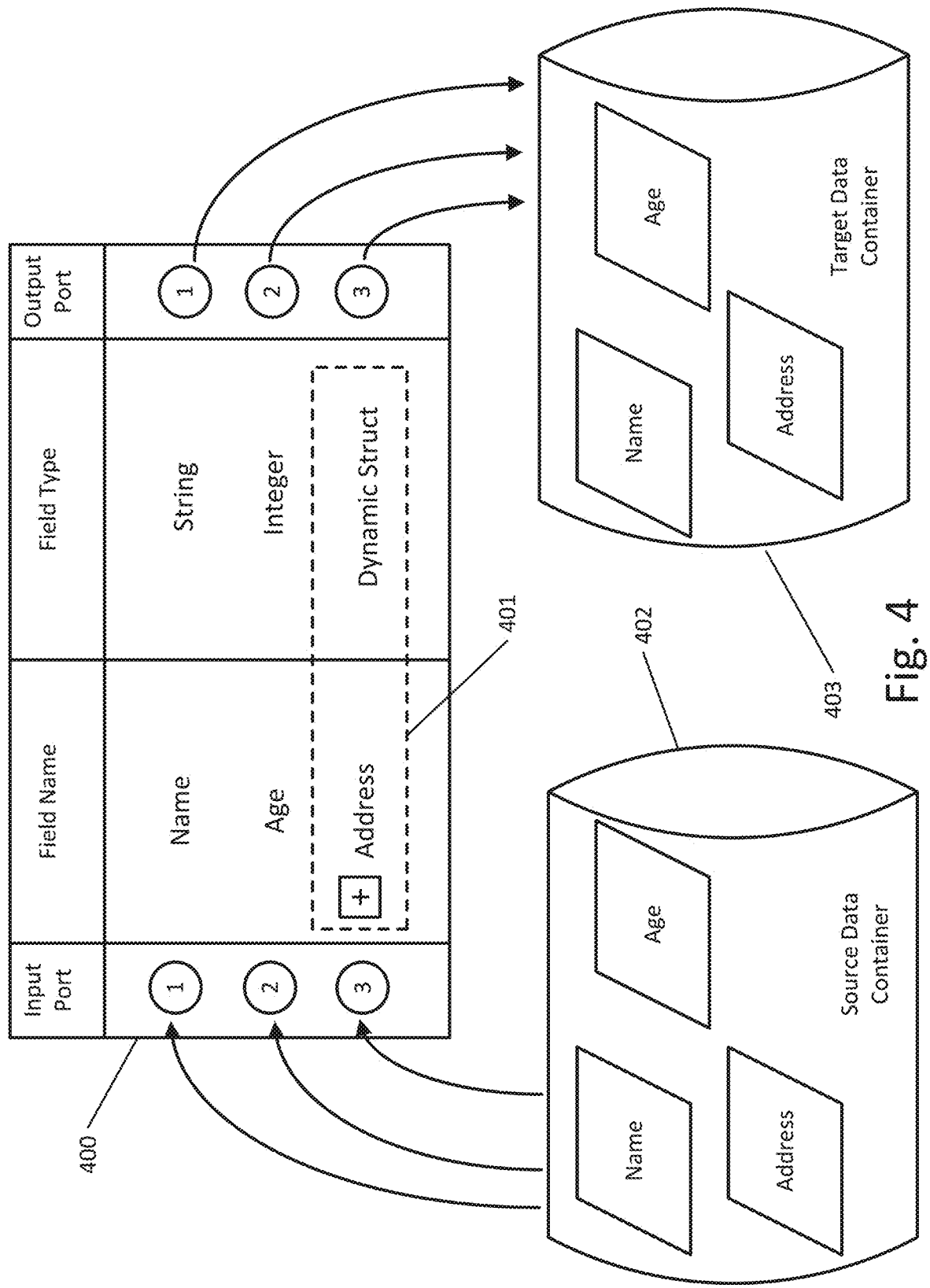
FIG. 4 illustrates a set of data flow mappings including a dynamic data flow mapping according to an exemplary embodiment.

FIG. 4 illustrates a set of data flow mappings including a dynamic data flow mapping according to an exemplary embodiment. Data flow mappings 400 map between a source data container 402 and a target data container 403. In this case, each of the source data container 402 and the target data container 403 include the fields Name, Age, and Address. Each data flow mapping specifies fields that can be encoded as an input port (corresponding to a source container in a source schema), an output port (corresponding a destination container in a destination schema), or both. In the example shown in FIG. 4, each of the fields in the data flow mappings 400 (Name, Age, and Address) are mapped to both the input port and the output ports. This means, for example, that the data field "Age" is read from a field "Age" in the source data container 402 and written to a field "Age" in the target data container 403.

As shown in FIG. 4, the address field is a hierarchical data type in both the source data container 402 and the target data container 403, and the data flow mapping for this field is defined and stored as a dynamic data flow mapping 401. The address field in the dynamic data flow mapping is a dynamic hierarchical structure ("dynamic struct") that will not have a defined quantity or type of sub-fields until compilation of the data flow mappings 400 with the source data container 402 and the target data container 403. The sub-fields of the Address field are therefore variable in quantity and type until compilation of the dynamic data flow mapping 401.

Figure 5:
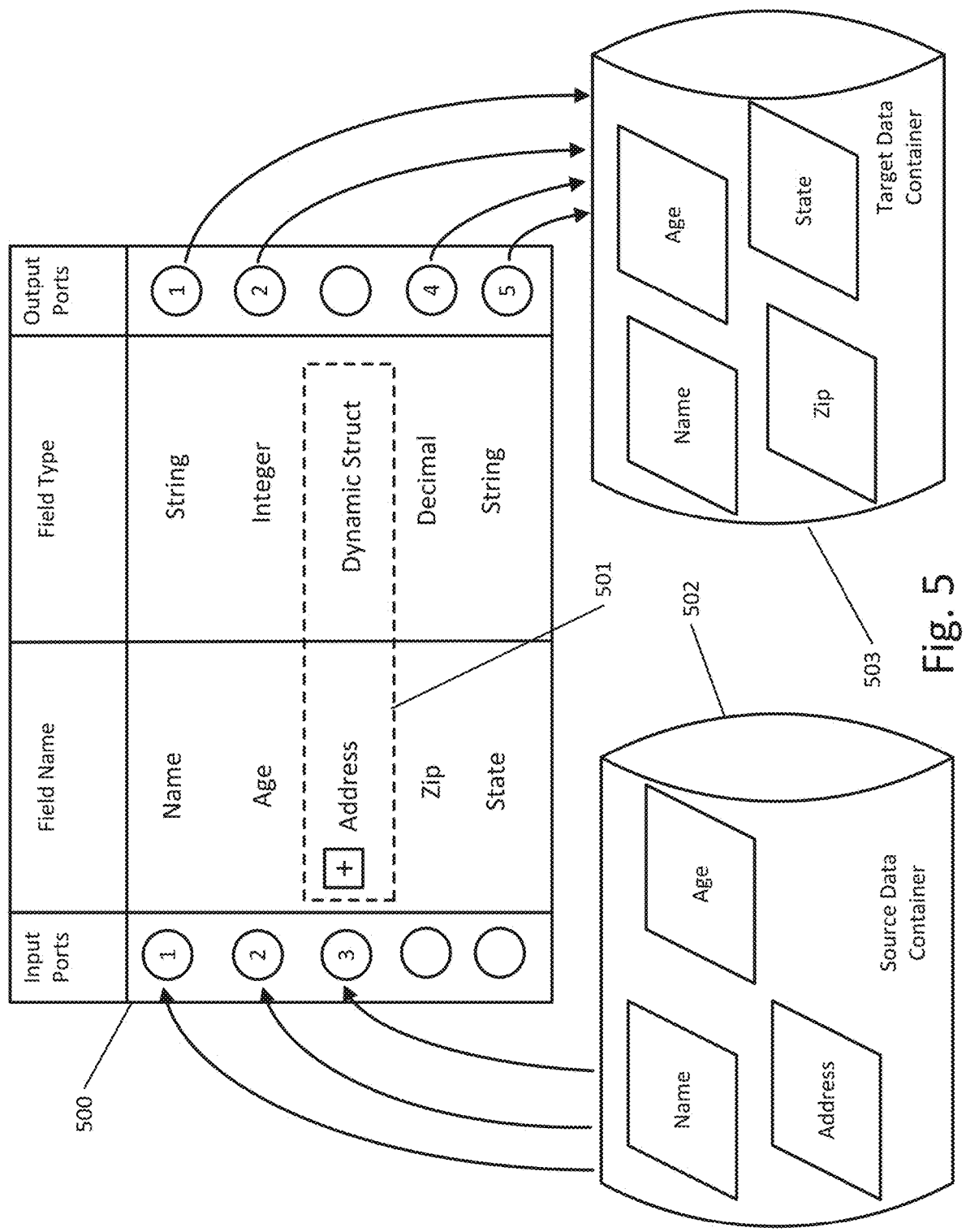
FIG. 5 illustrates another set of data flow mappings including a dynamic data flow mapping according to an exemplary embodiment.

FIG. 5 illustrates another set of data flow mappings including a dynamic data flow mapping according to an exemplary embodiment. FIG. 5 is similar to FIG. 4 and includes a set of data flow mappings 500, including dynamic data flow mapping 501, that map between a source data container 502 and a target data container 503. FIG. 5 differs from FIG. 4 in that the Address field, which is again a dynamic hierarchical structure, is mapped only to the input port and not the output port. Assuming that the Address field within the Source Data Container 502 includes sub-fields of Zip and State, these sub-fields will then be mapped separately to non-hierarchical fields Zip and State, which exist in the target data container 503 but not the source data container 502.

Returning to FIG. 3, at step 302 a rule language corresponding to each dynamic hierarchical data field in the one or more dynamic data flow mappings is determined. The rule language corresponding to each dynamic hierarchical data field can be determined by performing a look up of existing rule languages for previously used dynamic hierarchical data types/fields and/or generated based one or more factors, such as the underlying hierarchical data type of the dynamic hierarchical data type or field, characteristics or attributes of the source data container or target data container, performance considerations or optimizations, and/or user-input or preferences.

The rule language defines acceptable parameters for sub-fields of that dynamic hierarchical field/data type The rule language can have different applicable rules depending upon the type of hierarchical data. For a hierarchical data column denoting a structured collection of data, the rule language can supports all rules that are currently used to denote a collection of flat data columns. For a hierarchical data column denoting a recurring collection of identical data (such as an array), the language can allow for a singular rule describing the acceptable data types for a typical recurring element. For a hierarchical data column denoting a recurring collection of identical data where each recurring element has a reference key (such as a map), the rule language can allow for two rules or sets of rules—one describing the acceptable data types for the recurring element and another describing the acceptable data types for the reference key. The rules of the rule language are utilized as configuration parameters for the data flow mapping fragments and provide a set of filters and checks for designing data flow operations in a graphical environment where data columns/fields are joined using links that are translated to machine code at a later stage.

For example, the rule language can specify which data types can be instantiated as sub-fields of a dynamic hierarchical data field or type (e.g., integer, string, decimal, etc.), acceptable or restricted characteristics of those data types (e.g., precision), and/or acceptable or restricted characteristics of data values mapped to the sub-fields (e.g., maximum or minimum length, acceptable characters, acceptable range of values, syntax, etc.).

The rule language can also specify transformations or modifications to be performed to values mapped to input or output fields for a particular type of dynamic hierarchical data types when the values do not meet other criteria. For example, a rule can specify that any integer sub-fields of a dynamic hierarchical address field must have a particular precision value. Another related rule can specify operations to modify any input or output sub-fields to adjust the precision of a detected integer sub-field that has a different precision.

The data flow system and rule language used by the data flow is configured to process dynamic hierarchical data types and fields. In particular, the dynamic hierarchical data flow mapping system utilizes expression language that allows for expressions that treat name identifiers denoting dynamic hierarchical data columns as operands similar to the ones denoting usual hierarchical data columns. Additionally, the expression language is enhanced to allow for expressions that build hierarchical data structures out of flat/relational data in a dynamic fashion. This is the case, for example, when the output of a mapping or mapping fragment is a dynamic hierarchical data type and the input is non-hierarchical. This allows the rule language described with reference to step 302 to be used to describe or identify data elements for inclusion in a destination/target hierarchy.

The expression language of the present the dynamic hierarchical data flow mapping system is further enhanced to contain a new expression function that takes in a schema agnostic hierarchical column and returns a variable set of constituent hierarchical elements thereby flattening or reducing the hierarchical level of the previously nested hierarchical column. FIG. 5 illustrates this type of flattening operation, in which a hierarchical address field is flattened to a zip field and a state field.

The present mapping system is also able to take in a multi-occurring hierarchical column and normalize entire rows of data that contain a resultant column that is of variable type and denotes the multi occurring element of the hierarchical column, thereby the flattening or reducing the hierarchical level of the previously multi occurring hierarchical column At step 303 of FIG. 3, one or more static data flow mappings are generated by resolving all dynamic hierarchical fields into static hierarchical fields during compilation of the one or more dynamic data flow mappings with the source data container and the destination data container. The one or more static data flow mappings are generated based at least in part on the rule language corresponding to each dynamic hierarchical data type and underlying data in the source data container and/or the destination data container.

Figure 6:
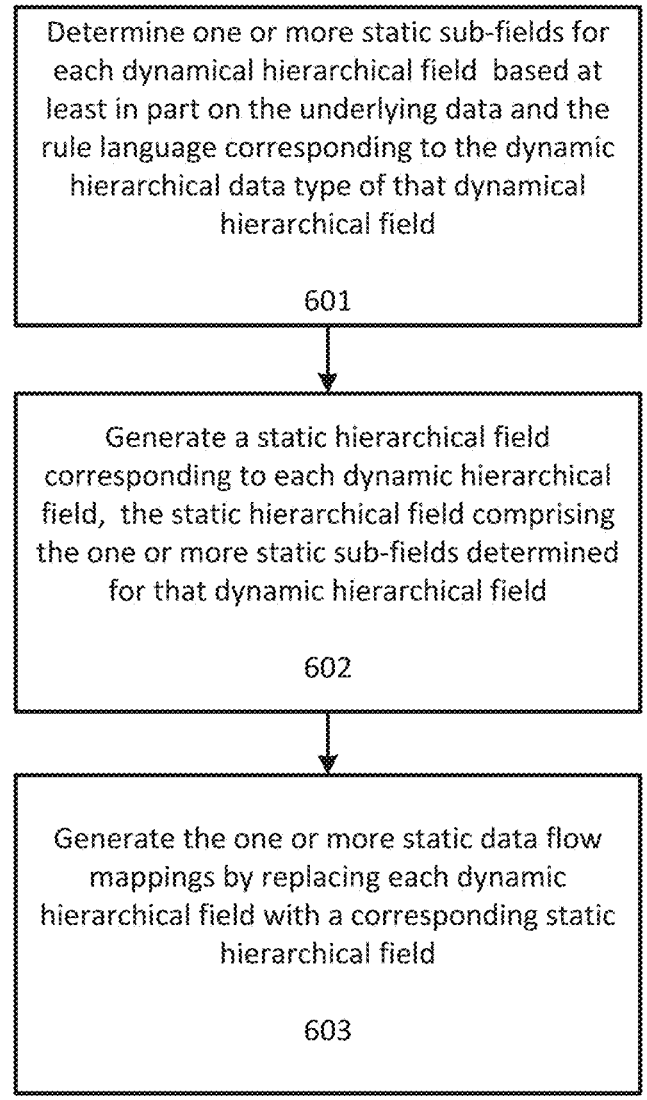
FIG. 6 illustrates a method for generating one or more static data flow mappings by resolving all dynamic hierarchical fields into static hierarchical fields during compilation of the one or more dynamic data flow mappings with the source data container and the destination data container according to an exemplary embodiment.

FIG. 6 illustrates a method for generating one or more static data flow mappings by resolving all dynamic hierarchical fields into static hierarchical fields during compilation of the one or more dynamic data flow mappings with the source data container and the destination data container according to an exemplary embodiment.

At step 601 one or more static sub-fields are determined for each dynamical hierarchical field based at least in part on the underlying data and the rule language corresponding to the dynamic hierarchical data type of that dynamical hierarchical field. This step resolves all dynamic hierarchical fields in the one or more dynamic data flow mappings into static hierarchical fields using the underlying data and applicable rules during compilation of the one or more dynamic data flow mappings. The underlying data can be the source data set (container) or the target data set (container), depending on whether the dynamic hierarchical fields are input fields or output fields of a dynamic data flow mapping.

When a data flow mapping that is designed dynamically is executed, it first requires a phase to resolve all dynamic elements in the mapping, apart from running other logical on the data flow operation denoted by the mapping. This phase is called data flow mapping compilation. In this step the hierarchical data source that is chosen to run with the data flow mapping (i.e., the input and/or output hierarchical data field) is used to transform the dynamic hierarchical fields having a dynamic/variable number of subfields into static hierarchical fields having a static number of subfields that correspond to the relevant hierarchical data in the underlying data set.

Step 601 includes traversing a data flow mapping graph corresponding to the one or more data flow mappings in a topological order and traversing data transformations in the order in which data would flow at runtime. On visiting each data transformation, dynamic hierarchical data fields are identified. A scope of the metadata that can potentially flow through each of them is computed based on the underlying data set. In other words, the portion of the underlying data set corresponding to each dynamic hierarchical data field is identified and that portion of the underlying data set is analyzed to determine which subfields are associated with that particular instance of a hierarchical data field. This subfield information is metadata corresponding to that instance of the dynamic hierarchical data field and defines the subfields that can flow through the hierarchical data field (both input and output).

Step 601 additionally includes applying the one or more rules defined during the design phase on the metadata to filter and/or modify the metadata. The resultant metadata is then used to build a schema (subfields) that describes the shape of the hierarchical data. This dynamic computation of the hierarchical data type configuration relieves a user of the obligation to define the hierarchical data types for all different versions of data with minor structural differences within them. At the end of step 601, one or more static sub-fields for each dynamical hierarchical field are determine.

Figure 7:
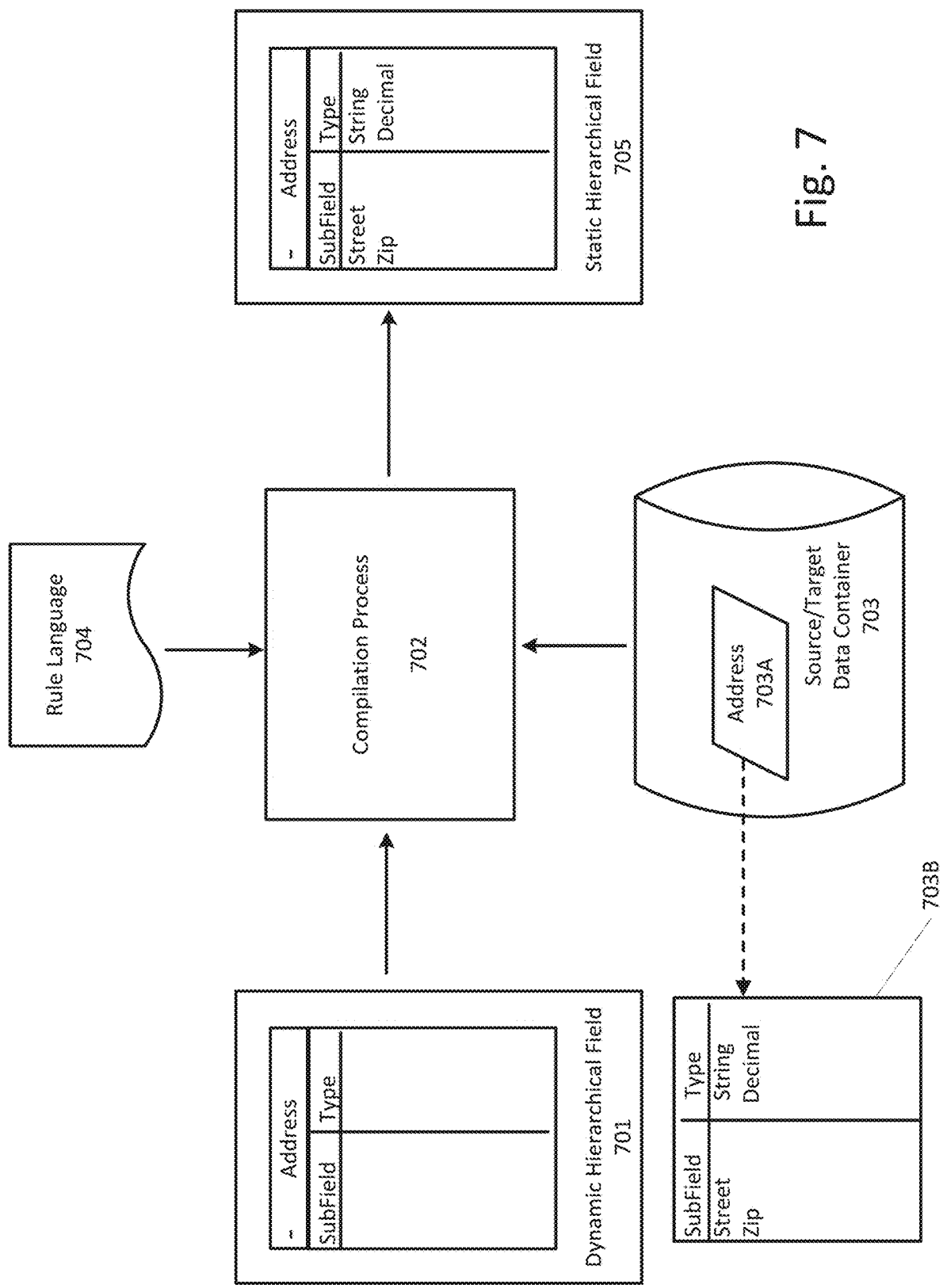
FIG. 7 illustrates an example of the static sub-field determination and static hierarchical field generation process according to an exemplary embodiment.

At step 602 a static (non-dynamic) hierarchical field corresponding to each dynamic hierarchical field is generated. The static hierarchical field includes the one or more static sub-fields determined for that dynamic hierarchical field in step 601. The generated static hierarchical fields are not persisted and are applicable only to the current instance of an ETL job. This allows the dynamic data flow mappings to be run in multiple different instances with differently structured/shaped hierarchical data FIG. 7 illustrates an example of the static sub-field determination and static hierarchical field generation process according to an exemplary embodiment. As shown in FIG. 7, the address field is a dynamic hierarchical field 701 and does not have any sub-fields or types defined prior to compilation of the data flow mapping.

The dynamic hierarchical field 701, the determined rule language 704 for that dynamic hierarchical field, and the source and/or target data container 703 are provided to the compilation process 702.

During the compilation process, the underlying sub-fields in the address field 703A of the source and/or target data container 703 may be detected and/or filtered by the rule language 704. As shown in box 703B, the address field 703A in the underlying source/target data container 703 includes two sub-fields, Street and Zip. These two sub-fields can then be identified as corresponding to the dynamic hierarchical field and used to generate the static hierarchical field 705 corresponding to dynamic hierarchical field 701.

During the compilation process, the underlying sub-fields in the address field 703A of the source and/or target data container 703 may be detected and/or filtered by the rule language 704. As shown in box 703B, the address field 703A in the underlying source/target data container 703 includes two sub-fields, Street and Zip. These two sub-fields can then be identified as corresponding to the dynamic hierarchical field and used to generate the static hierarchical field 705 corresponding to dynamic hierarchical field 701.

Figure 8:
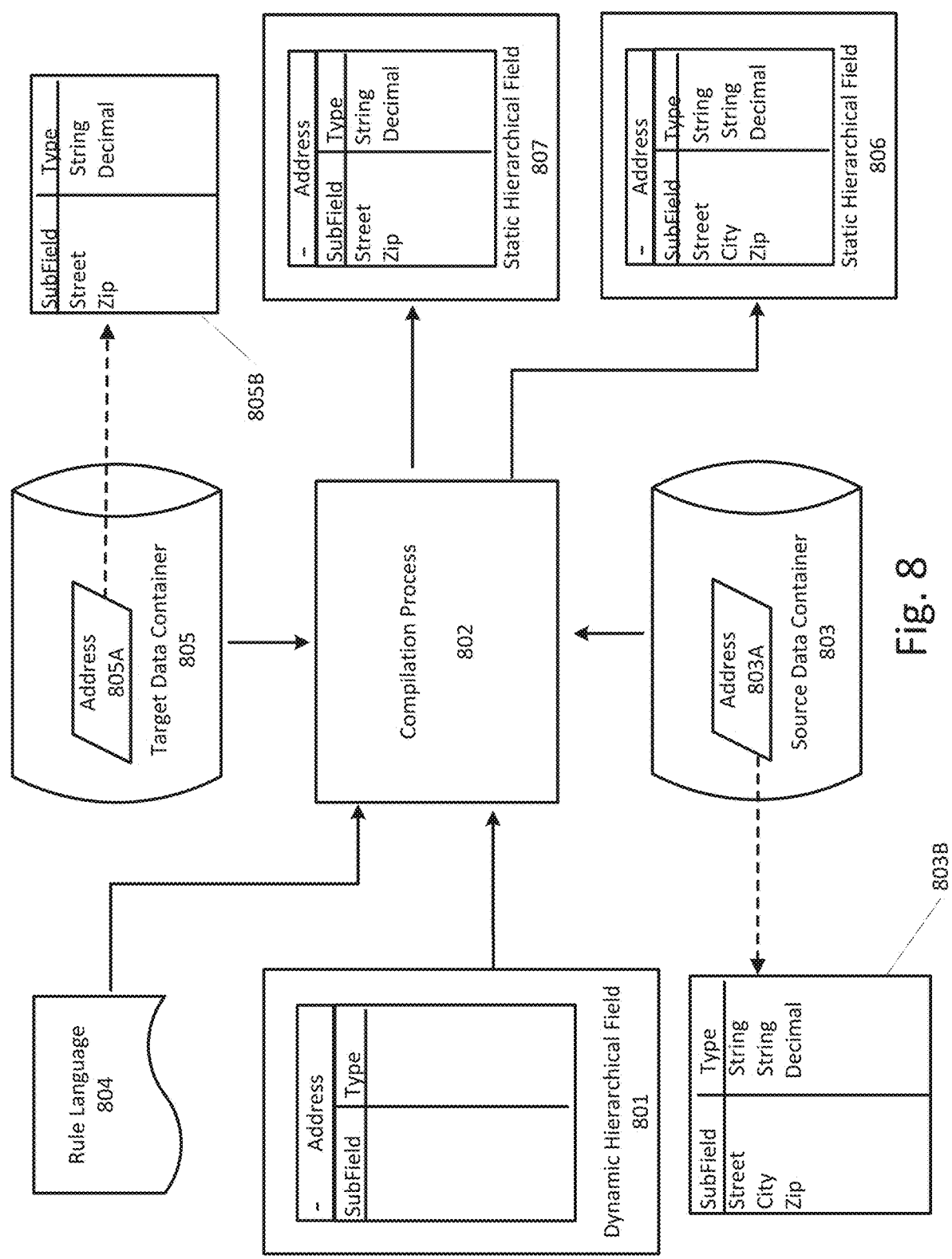
FIG. 8 illustrates another example of the static sub-field determination and static hierarchical field generation process according to an exemplary embodiment.

FIG. 8 illustrates another example of the static sub-field determination and static hierarchical field generation process according to an exemplary embodiment. As shown in FIG. 8, the address field is a dynamic hierarchical field 801 and does not have any sub-fields or types defined prior to compilation of the data flow mapping.

In the example of FIG. 8, the dynamic hierarchical field 801, the determined rule language 804 for that dynamic hierarchical field, the source data container 803 and the target data container 805 are all provided to the compilation process 802.

As shown in box 803B, the address field 803A in the source data container 803 has a distinct set of sub-fields than the address field 805A in the target data container 805. In particular, address field 805A in the target data container has subfields Street and Zip, as shown in box 805B, whereas the address field 803A in the Source Data Container has subfields Street, City, and Zip.

As a result of this, two instances of a static hierarchical field corresponding to the dynamic hierarchical field 801 can be generated. Static hierarchical field 806 corresponds to the input mapping from source data container 803 to the address field in the dynamic hierarchical field 801 and static hierarchical field 807 corresponds to the output mapping from dynamic hierarchical field 801 to the target data container 805. Alternatively, the rules language can specify that only a single static hierarchical data field corresponding to the dynamic hierarchical field should be utilized (e.g., the structure of the field in the target container can be given priority).

Returning to FIG. 6, at step 603 one or more static data flow mappings are generated (for the current instance of an ETL job) by replacing each dynamic hierarchical field in the dynamic data flow mappings with corresponding static hierarchical fields.

Returning to FIG. 3, at step 304 the one or more static data flow mappings are executed to map data from the source data container to the destination data container. During execution of the static data flow mappings, data in one or more of the source container or the destination data container is stored in the static hierarchical fields generated from a dynamic hierarchical fields.

The execution of the one or more static data flow mappings performs the mapping operations specified by the one or more dynamic data mappings on the underlying data set. The resulting mapping operations will correspond to the dynamic data flow mappings but will be customized to variations of the hierarchical data field in a particular instance of underlying data. The resulting mapping metadata from step 304 is non-dynamic and is executed as a non-dynamic mapping would be executed. This step also acts as a reliable checkpoint to verify if the data flow mapping being executed is of the intended nature and there is no additional performance overhead.

Figure 9:
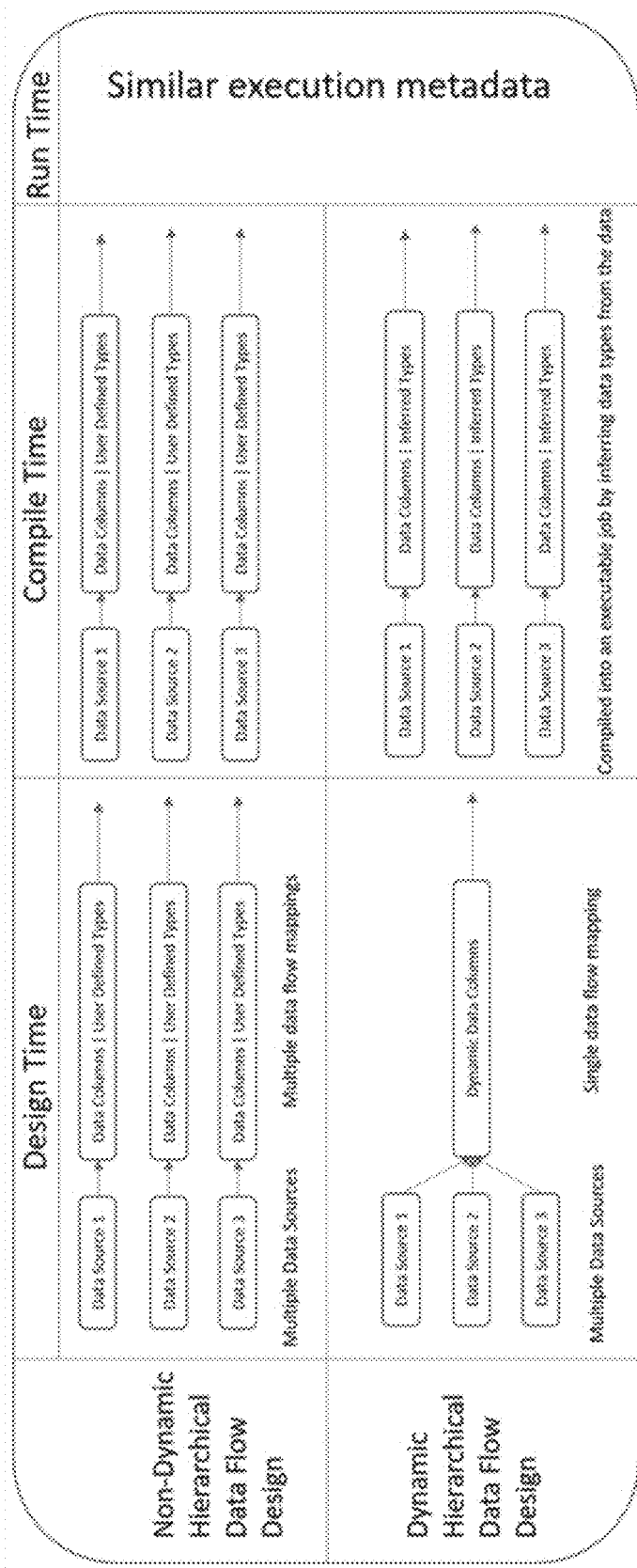
FIG. 9 illustrates a schematic comparing the life cycles of non-dynamic hierarchical data flow mappings and dynamic hierarchical data flow mappings.

FIG. 9 illustrates a schematic comparing the life cycles of non-dynamic hierarchical data flow mappings and dynamic hierarchical data flow mappings. As shown in FIG. 9, the dynamic hierarchical data flow mappings and associated methods disclosed herein enable re-use and adaption of hierarchical data fields to the characteristics of an underlying data set, based on compile-time analysis of the data set metadata corresponding to each hierarchical field.

Figure 10:
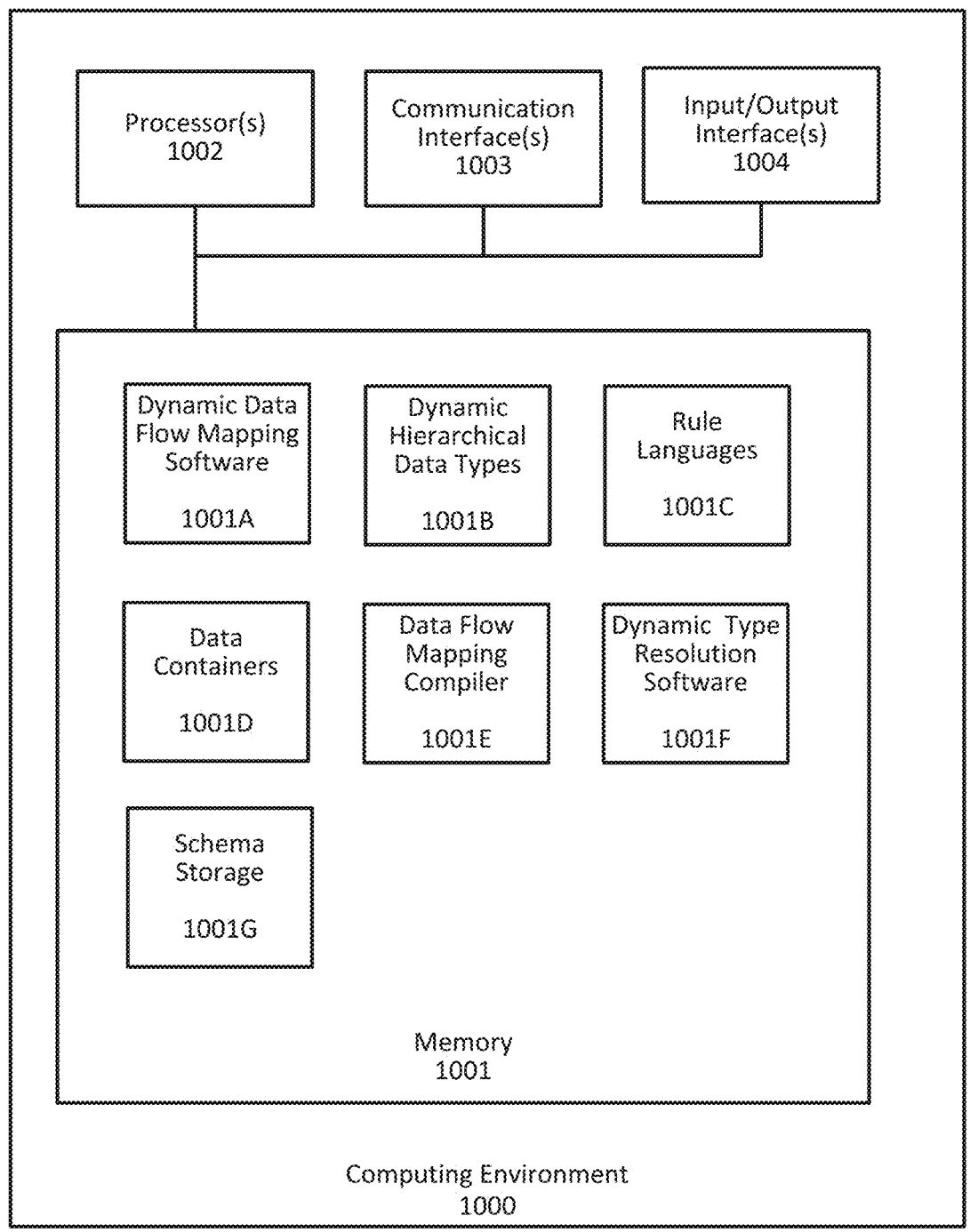
FIG. 10 illustrates a specialized computing environment for dynamic hierarchical data flow mapping according to an exemplary embodiment.

FIG. 10 illustrates a specialized computing environment for dynamic hierarchical data flow mapping according to an exemplary embodiment. Computing environment 1000 includes a memory 1001 that is a non-transitory computer-readable medium and can be volatile memory (e.g., registers, cache, RAM), non-volatile memory (e.g., ROM, EEPROM, flash memory, etc.), or some combination of the two.

Memory 1001 includes dynamic data flow mapping software 1001A, dynamic hierarchical data types 1001B, rule languages 1001C, data containers 1001D, the data flow mapping compiler 1001E, dynamitic type resolution software for mapping dynamic to static types 1001F, and schema storage 1001G. The memory 1001 can include specialized software, comprising specialized instructions, that when executed by the processor 1002, cause the processor to perform any of the functionality described herein. The memory 1001 can also store data corresponding to the datasets, dynamic and non-dynamic mappings, and intermediate values of the processes described herein. All of the software stored within memory 1001 can be stored as a computer-readable instructions, that when executed by one or more processors 1002, cause the processors to perform the functionality described with respect to FIGS. 2-9.

Processor(s) 1002 execute computer-executable instructions and can be a real or virtual processors. In a multi-processing system, multiple processors or multicore processors can be used to execute computer-executable instructions to increase processing power and/or to execute certain software in parallel.

The computing environment additionally includes a communication interface 1003, such as a network interface, which is used to communicate with source and target data sources and databases and with user-facing applications on other devices, such as data-flow design applications. The communication interface conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Computing environment 1000 further includes input and output interfaces 1004 that allow users (such as system administrators) to provide input to the system and display or otherwise transmit information for display to users.

An interconnection mechanism (shown as a solid line in FIG. 10), such as a bus, controller, or network interconnects the components of the computing environment 1000.

Input and output interfaces 1004 can be coupled to input and output devices. The input device(s) can be a touch input device such as a keyboard, mouse, pen, trackball, touch screen, or game controller, a voice input device, a scanning device, a digital camera, remote control, or another device that provides input to the computing environment. The output device(s) can be a display, television, monitor, printer, speaker, or another device that provides output from the computing environment 1000. Displays can include a graphical user interface (GUI) that presents a graphical data flow editing and creation interface to designers.

The computing environment 1000 can additionally utilize a removable or non-removable storage, such as magnetic disks, magnetic tapes or cassettes, CD-ROMs, CD-RWs, DVDs, USB drives, or any other medium which can be used to store information and which can be accessed within the computing environment 1000.

The computing environment 1000 can be a set-top box, personal computer, a client device, a database or databases, or one or more servers, for example a farm of networked servers, a clustered server environment, or a cloud network of computing devices and/or distributed databases.

Having described and illustrated the principles of our invention with reference to the described embodiment, it will be recognized that the described embodiment can be modified in arrangement and detail without departing from such principles. Elements of the described embodiment shown in software can be implemented in hardware and vice versa.

In view of the many possible embodiments to which the principles of our invention can be applied, we claim as our invention all such embodiments as can come within the scope and spirit of the following claims.

The invention claimed is:

1. A method executed by one or more computing devices for dynamic hierarchical data flow mapping, the method comprising:

storing, by at least one of the one or more computing devices, one or more dynamic data flow mappings, each dynamic data flow mapping comprising a mapping of data from an input port corresponding to a source data container to an output port corresponding to a destination data container and further comprising a dynamic hierarchical field having a dynamic hierarchical data type;

determining, by at least one of the one or more computing devices, a rule language corresponding to each dynamic hierarchical field in the one or more dynamic data flow mappings, the rule language defining acceptable parameters for sub-fields of that dynamic hierarchical field; and generating, by at least one of the one or more computing devices, one or more static data flow mappings by resolving all dynamic hierarchical fields into static hierarchical fields during compilation of the one or more dynamic data flow mappings with the source data container and the destination data container, the one or more static data flow mappings being generated based at least in part on the rule language corresponding to each dynamic hierarchical field and underlying data in one or more of: the source data container or the destination data container.

2. The method of claim 1, further comprising:
executing, by at least one of the one or more computing devices, the one or more static data flow mappings to map data from the source data container to the destination data container, wherein data in one or more of the source container or the destination data container is stored in a static hierarchical field generated from a dynamic hierarchical field.

3. The method of claim 1, further comprising, prior to storing the one or more dynamic data flow mappings:
receiving, by at least one of the one or more computing devices, an input from a user specifying the dynamical hierarchical field and one or more of the input port or the output port; and
initializing, by at least one of the one or more computing devices, a dynamic data flow mapping having the dynamic hierarchical data type.

4. The method of claim 1, further comprising, prior to storing the one or more dynamic data flow mappings:
receiving, by at least one of the one or more computing devices, a data flow mapping comprising a mapping of data from the input port corresponding to the source data container to the output port corresponding to destination data container; and
determining, by at least one of the one or more computing devices, that the data flow mapping is a dynamic data flow mapping based at least in part on detection of the dynamic hierarchical field in the data flow mapping.

5. The method of claim 1, wherein each rule language defines one or more of: acceptable data types of a sub-field, acceptable data range of a sub-field, acceptable data values of a sub-field, or acceptable data syntax of a sub-field.

6. The method of claim 1, wherein generating one or more static data flow mappings by resolving all dynamic hierarchical fields into static hierarchical fields during compilation of the one or more dynamic data flow mappings with the source data container and the destination data container comprises:
determining one or more static sub-fields for each dynamical hierarchical field based at least in part on the underlying data and the rule language corresponding to that dynamical hierarchical field;

generating a static hierarchical field corresponding to each dynamic hierarchical field, the static hierarchical field comprising the one or more static sub-fields determined for that dynamic hierarchical field; and generating the one or more static data flow mappings by replacing each dynamic hierarchical field with a corresponding static hierarchical field.

7. The method of claim 1, wherein the one or more dynamic data flow mappings comprise a mapping between a hierarchical data field and a plurality of non-hierarchical data fields.

8. An apparatus for dynamic hierarchical data flow mapping, the apparatus comprising:
one or more processors; and
one or more memories operatively coupled to at least one of the one or more processors and having instructions stored thereon that, when executed by at least one of the one or more processors, cause at least one of the one or more processors to:
store one or more dynamic data flow mappings, each dynamic data flow mapping comprising a mapping of data from an input port corresponding to a source data container to an output port corresponding to a destination data container and further comprising a dynamic hierarchical field having a dynamic hierarchical data type;
determine a rule language corresponding to each dynamic hierarchical field in the one or more dynamic data flow mappings, the rule language defining acceptable parameters for sub-fields of that dynamic hierarchical field; and
generate one or more static data flow mappings by resolving all dynamic hierarchical fields into static hierarchical fields during compilation of the one or more dynamic data flow mappings with the source data container and the destination data container, the one or more static data flow mappings being generated based at least in part on the rule language corresponding to each dynamic hierarchical field and underlying data in one or more of: the source data container or the destination data container.

9. The apparatus of claim 8, wherein at least one of the one or more memories has further instructions stored thereon that, when executed by at least one of the one or more processors, cause at least one of the one or more processors to:
execute the one or more static data flow mappings to map data from the source data container to the destination data container, wherein data in one or more of the source container or the destination data container is stored in a static hierarchical field generated from a dynamic hierarchical field.

10. The apparatus of claim 8, wherein at least one of the one or more memories has further instructions stored thereon that, when executed by at least one of the one or more processors, cause at least one of the one or more processors to, prior to storing the one or more dynamic data flow mappings:
receive an input from a user specifying the dynamical hierarchical field and one or more of the input port or the output port; and
initialize a dynamic data flow mapping having the dynamic hierarchical data type.

11. The apparatus of claim 8, wherein at least one of the one or more memories has further instructions stored thereon that, when executed by at least one of the one or more processors, cause at least one of the one or more processors to, prior to storing the one or more dynamic data flow mappings:

receive a data flow mapping comprising a mapping of data from the input port corresponding to the source data container to the output port corresponding to destination data container; and determine that the data flow mapping is a dynamic data flow mapping based at least in part on detection of the dynamic hierarchical field in the data flow mapping.

12. The apparatus of claim 8, wherein each rule language defines one or more of: acceptable data types of a sub-field, acceptable data range of a sub-field, acceptable data values of a sub-field, or acceptable data syntax of a sub-field.

13. The apparatus of claim 8, wherein the instructions that, when executed by at least one of the one or more processors, cause at least one of the one or more processors to generate one or more static data flow mappings by resolving all dynamic hierarchical fields into static hierarchical fields during compilation of the one or more dynamic data flow mappings with the source data container and the destination data container further cause at least one of the one or more processors to:

determine one or more static sub-fields for each dynamical hierarchical field based at least in part on the underlying data and the rule language corresponding to that dynamical hierarchical field;

generate a static hierarchical field corresponding to each dynamic hierarchical field, the static hierarchical field comprising the one or more static sub-fields determined for that dynamic hierarchical field; and generate the one or more static data flow mappings by replacing each dynamic hierarchical field with a corresponding static hierarchical field.

14. The apparatus of claim 8, wherein the one or more dynamic data flow mappings comprise a mapping between a hierarchical data field and a plurality of non-hierarchical data fields.

15. At least one non-transitory computer-readable medium storing computer-readable instructions for dynamic hierarchical data flow mapping that, when executed by one or more computing devices, cause at least one of the one or more computing devices to:

store one or more dynamic data flow mappings, each dynamic data flow mapping comprising a mapping of data from an input port corresponding to a source data container to an output port corresponding to a destination data container and further comprising a dynamic hierarchical field having a dynamic hierarchical data type;

determine a rule language corresponding to each dynamic hierarchical field in the one or more dynamic data flow mappings, the rule language defining acceptable parameters for sub-fields of that dynamic hierarchical field; and generate one or more static data flow mappings by resolving all dynamic hierarchical fields into static hierarchical fields during compilation of the one or more dynamic data flow mappings with the source data container and the destination data container, the one or more static data flow mappings being generated based at least in part on the rule language corresponding to each dynamic hierarchical field and underlying data in one or more of: the source data container or the destination data container.

16. The at least one non-transitory computer-readable medium of claim 15, wherein at least one of the one or more memories has further instructions stored thereon that, when executed by at least one of the one or more computing devices, cause at least one of the one or more computing devices to:

execute the one or more static data flow mappings to map data from the source data container to the destination data container, wherein data in one or more of the source container or the destination data container is stored in a static hierarchical field generated from a dynamic hierarchical field.

17. The at least one non-transitory computer-readable medium of claim 15, wherein at least one of the one or more memories has further instructions stored thereon that, when executed by at least one of the one or more computing devices, cause at least one of the one or more computing devices to, prior to storing the one or more dynamic data flow mappings:

receive an input from a user specifying the dynamical hierarchical field and one or more of the input port or the output port; and initialize a dynamic data flow mapping having the dynamic hierarchical data type.

18. The at least one non-transitory computer-readable medium of claim 15, wherein at least one of the one or more memories has further instructions stored thereon that, when executed by at least one of the one or more computing devices, cause at least one of the one or more computing devices to, prior to storing the one or more dynamic data flow mappings:

receive a data flow mapping comprising a mapping of data from the input port corresponding to the source data container to the output port corresponding to destination data container; and determine that the data flow mapping is a dynamic data flow mapping based at least in part on detection of the dynamic hierarchical field in the data flow mapping.

19. The at least one non-transitory computer-readable medium of claim 15, wherein each rule language defines one or more of: acceptable data types of a sub-field, acceptable data range of a sub-field, acceptable data values of a sub-field, or acceptable data syntax of a sub-field.

20. The at least one non-transitory computer-readable medium of claim 15, wherein the instructions that, when executed by at least one of the one or more computing devices, cause at least one of the one or more computing devices to generate one or more static data flow mappings by resolving all dynamic hierarchical fields into static hierarchical fields during compilation of the one or more dynamic data flow mappings with the source data container and the destination data container further cause at least one of the one or more computing devices to:

determine one or more static sub-fields for each dynamical hierarchical field based at least in part on the underlying data and the rule language corresponding to that dynamical hierarchical field;

generate a static hierarchical field corresponding to each dynamic hierarchical field, the static hierarchical field comprising the one or more static sub-fields determined for that dynamic hierarchical field; and generate the one or more static data flow mappings by replacing each dynamic hierarchical field with a corresponding static hierarchical field.

21. The at least one non-transitory computer-readable medium of claim 15, wherein the one or more dynamic data flow mappings comprise a mapping between a hierarchical data field and a plurality of non-hierarchical data fields.

* * * * *